United States Patent
Hutz et al.

(10) Patent No.: US 9,609,721 B1
(45) Date of Patent: Mar. 28, 2017

(54) LIGHT CONTROLLER

(71) Applicant: Alarm.com Incorporated, Tysons, VA (US)

(72) Inventors: David James Hutz, Herndon, VA (US); Robert Leon Lutes, Lawrence, KS (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/178,031

(22) Filed: Jun. 9, 2016

Related U.S. Application Data

(60) Provisional application No. 62/172,857, filed on Jun. 9, 2015, provisional application No. 62/304,992, filed on Mar. 8, 2016.

(51) Int. Cl.
*H05B 37/02* (2006.01)
*H05B 33/08* (2006.01)
*H05B 39/04* (2006.01)

(52) U.S. Cl.
CPC ..... *H05B 37/0218* (2013.01); *H05B 33/0854* (2013.01); *H05B 37/0227* (2013.01); *H05B 37/0272* (2013.01); *H05B 37/0281* (2013.01); *H05B 39/042* (2013.01)

(58) Field of Classification Search
CPC ............ H05B 37/0218; H05B 37/0281; H05B 37/0227; H05B 33/0854; H05B 39/042
USPC ........................................................ 315/294
See application file for complete search history.

(56) References Cited

U.S. PATENT DOCUMENTS

| | | | | |
|---|---|---|---|---|
| 9,456,482 B1* | 9/2016 | Pope | ............... | H05B 33/0854 |
| 2011/0307112 A1* | 12/2011 | Barrilleaux | ............ | H05B 37/02 |
| | | | | 700/291 |
| 2012/0206050 A1* | 8/2012 | Spero | ...................... | B60Q 1/04 |
| | | | | 315/152 |
| 2013/0200805 A1* | 8/2013 | Scapa | ................ | F21V 23/0457 |
| | | | | 315/131 |
| 2013/0307419 A1* | 11/2013 | Simonian | ........... | H05B 33/0872 |
| | | | | 315/153 |
| 2014/0052220 A1* | 2/2014 | Pedersen | ............. | A61N 5/0618 |
| | | | | 607/88 |
| 2016/0174339 A1* | 6/2016 | Rajagopalan | ...... | H05B 37/0218 |
| | | | | 315/152 |
| 2016/0295658 A1* | 10/2016 | Chraibi | ............. | H05B 33/0845 |
| 2016/0338179 A1* | 11/2016 | Aliakseyeu | ........ | H05B 37/0245 |
| 2016/0341437 A1* | 11/2016 | Matsuoka | ............. | F24F 11/006 |

* cited by examiner

*Primary Examiner* — Don Le
(74) *Attorney, Agent, or Firm* — Fish & Richardson P.C.

(57) ABSTRACT

Methods, systems, and apparatus, including computer programs encoded on a computer storage medium, for performing actions based on a determined relative composition of light. In some implementations, data representing an amount of ambient light detected within the portion of the property by a light sensor located at the portion of the property is initially obtained. Data indicating (i) a shape of an optical spectra for a natural light source, and (ii) a shape of an optical spectra for a non-natural light source is then obtained. A relative composition of the ambient light detected within the portion of the property is determined. An estimated amount of natural light within the portion of the property is then determined. In response, the amount of light output by one or more light sources located at the portion of the property is adjusted.

20 Claims, 11 Drawing Sheets

LIGHT CONTROLLER

CROSS-REFERENCE TO RELATED APPLICATIONS

This application claims priority from U.S. Provisional Application No. 62/172,857, filed Jun. 9, 2015, and titled "LIGHT CONTROLLER," and U.S. Provisional Application No. 62/304,992, filed Mar. 8, 2016, and titled "LIGHT CONTROLLER," which are hereby incorporated by reference in their entireties.

TECHNICAL FIELD

This disclosure relates to spectroscopic technology and, for example, light controllers for measuring ambient light.

BACKGROUND

Connected home systems may include control panels that a user may use to control operations of the light sources within the property based on light levels perceived by the user. For example, a user may interact with a control panel to turn on a light source when it is dark or turn off a light source.

SUMMARY

Techniques are described for controlling light sources inside a property. For example, techniques are described for intelligently adjusting the operations of light sources based on measuring the amount of natural light present within a room inside the property.

In some implementations, intelligent light controllers may be used to determine the amount of natural light in a room based on the composition of ambient light. For example, an intelligent light controller may sense twenty lux due to natural light. The light controller may determine an amount of natural light based on signature peaks and troughs in ambient light. For example, the light controller may analyze the optical spectra of sensed light to determine the amount of light from natural light and artificial light. Additionally or alternatively, intelligent light controllers may be used to adjust the operations of light sources based on determining whether a threshold level is satisfied by the amount of natural light within a room. For example, the light controller may turn off a light source when the amount of natural light sensed satisfies a threshold level that is associated with natural light alone providing sufficient visibility.

In some implementations, a method is performed by one or more computers. The method may include: obtaining data representing an amount of ambient light detected within the portion of the property by a light sensor located at the portion of the property; obtaining data indicating (i) a shape of an optical spectra for a natural light source, and (ii) a shape of an optical spectra for a non-natural light source; determining a relative composition of the ambient light detected within the portion of the property based at least on (i) the shape of the optical spectra for the natural light source, and (ii) the shape of the optical spectra for the non-natural light source; determining an estimated amount of natural light within the portion of the property based on the amount of ambient light detected within the portion of the property and the determined relative composition of the ambient light detected within the portion of the property; determining to adjust an amount of light output by one or more light sources located at the portion of the property based on the estimated amount of natural light within the portion of the property; and in response to determining to adjust the amount of light output by one or more light sources located at the portion of the property based on the estimated amount of natural light within the portion of the property, adjusting the amount of light output by one or more light sources located at the portion of the property.

Other versions of these and other aspects disclosed herein include corresponding devices, systems, and computer programs encoded on computer-readable storage devices that are configured to perform the actions of the methods. These and other aspects may include one or more of the features discussed below.

Implementations may include one or more optional features. For instance, in some implementations, the non-natural light source includes a light emitting diode (LED), a high-intensity discharge (HID) bulb, an incandescent bulb, or a fluorescent bulb.

In some implementations, determining to adjust an amount of light output by the one or more light sources located at the portion of the property includes determining that the estimated amount of natural light within the portion of the property satisfies a predetermined threshold for amount of natural light within the portion of the property.

In some implementations, adjusting the amount of light output by the one or more light sources located at the portion of the property includes transmitting an instruction to turn off at least one of the one or more light sources.

In some implementations, adjusting the amount of light output by the one or more light sources located at the portion of the property includes transmitting an instruction to reduce the amount of light output at least one of the one or more light sources located at the portion of the property without turning off the one or more light sources.

In some implementations, determining a relative composition of the ambient light detected within the portion of the property based at least on (i) the shape of the optical spectra for the natural light source, and (ii) the shape of the optical spectra for the non-natural light source includes: generating an intensity spectrum for the ambient light detected within the portion of the property by the light sensor located at the portion of the property; computing one or more characteristics for the generated intensity spectrum; comparing values of the computed one or more characteristics to threshold values based at least on (i) signature peaks in the shape of the optical spectra for the natural light source, and (ii) the signature peaks in the shape of the optical spectra for the non-natural light source; and determining the relative composition of the ambient light detected within the portion of the property based on the values of the computed one or more characteristics to threshold values.

In some implementations, the one or more characteristics for the generated intensity spectrum includes a peak intensity point within the generated intensity spectrum, and one or more slope measurements for particular pixel offsets from the peak intensity point within the generated intensity spectrum.

In some implementations, adjusting the amount of light output by one or more light sources located at the portion of the property includes transmitting an instruction to a light controller to adjust the amount of light output by one or more light sources located at the portion of the property.

In some implementations, adjusting the amount of light output by one or more light sources located at the portion of the property includes transmitting an instruction to a light controller to adjust the amount of light output by one or more light sources located at the portion of the property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for implementing intelligent light controllers to turn off light sources based on determining that a threshold level of natural light is satisfied within a room. A light sensor may measure ambient light produced from light sources within the room. Signature peaks and troughs in the measured ambient light may be determined based on the optical spectra of the measured ambient light. The composition of the ambient light may be determined based on the signature peaks of the optical spectra of the measured ambient light. The light sensor may determine the amount of natural light in the room based on the composition of the ambient light.

Accordingly, techniques are described to monitor amount of natural light in a room and automatically control light sources in response to determining that a room satisfies a threshold level of natural light. For example, a light sensor may compare the amount of natural light to a threshold level for natural light within a room. In response, a monitoring system control unit may determine if the threshold level of natural light in the room is satisfied based on comparison of the amount of light measured to the threshold level. The monitoring system control unit may also transmit a signal indicating that the threshold level of natural light in the room is satisfied. In response, a light controller may adjust the operation of one or more light sources.

Figure 1:
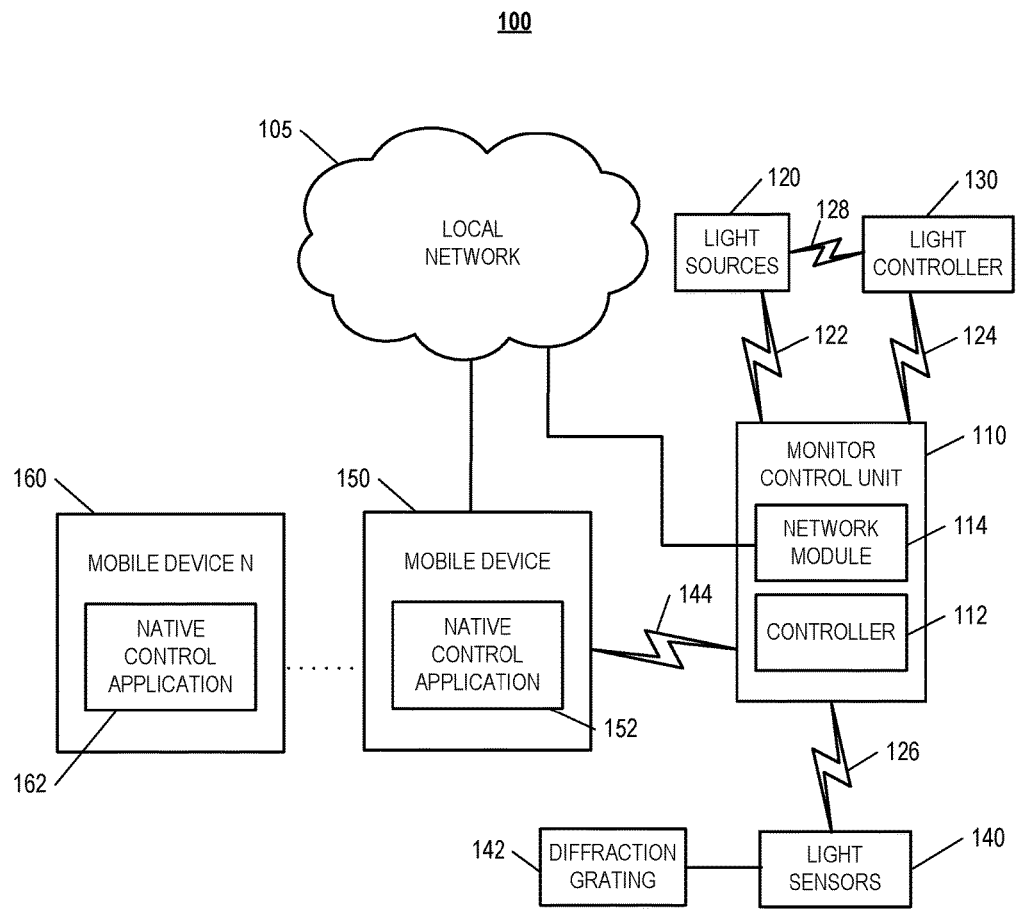
FIG. 1 illustrates an example of a system.

FIG. 1 illustrates an example of a system 100 that may be configured to measure the amount of natural light in a room. The system 100 may include a network 105, a monitoring system control unit 110, one or more light sources 120, a light controller 130, a light sensor 140, a diffraction grating 142, one or more mobile devices 150, 160. The network 105 may be configured to enable electronic communications between devices connected to the network 105. For example, the network 105 may be configured to enable exchange of electronic communications between the monitoring system control unit 110, and the one or more mobile devices 150, 160.

The network 105 may include, for example, one or more of the Internet, Wide Area Networks (WANs), Local Area Networks (LANs), Wi-Fi, analog or digital wired and wireless telephone networks, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The monitoring system control unit 110 may include a controller 112 and a network module 114. The controller 112 may be configured to control a system, e.g., a home automation system associated with a property that includes the monitoring system control unit 110. In some examples, the controller 112 may include a processor or other control circuitry configured to execute instructions of a program that controls operation of the home automation system. In these examples, the controller 112 may be configured to receive input from sensors, detectors, or other devices associated with the home automation system and control operation of components of the home automation system, e.g., a light sensor, a control switch, a power dial, or other devices associated with the property, such as appliances, lights, etc. For example, the controller 112 may be configured to control operation of the network module 114 included in the monitoring system control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a wireless data channel. In this example, the network module 114 may transmit user location data within or external to the property, environmental data from the property, e.g., indoors at the property or outdoors at the property, or other data over a wireless data channel. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the monitoring system control unit 110 to communicate over the telephone lines of Plain Old Telephone Systems (POTS). In some implementations, the monitoring system control unit 110 may be a broadband or cellular gateway where the network module 114 may enable the monitoring system control unit 110 to communicate over the network 105.

The system 100 may communicate with one or more light sources 120, a light controller 130, and a light sensor 140 to monitor the amount of natural light inside a property and control the operation of the one or more light sources 120 based on the composition of ambient light within the property. The one or more light sources 120 may be light fixtures with various types of bulbs such as light emitting diode (LED) bulbs, high-intensity discharge (HID) bulbs, incandescent bulbs, or fluorescent bulbs that produce different lighting effects within a property. The light sources 120 may be configured to produce light to illuminate the property.

The light controller 130 may be an intelligent networking based light control device that incorporates communication between the one or more light sources 120 related to lighting control and with the use of the one or more light sources 120. In some instances, the light controller 130 may be used control the operation of the light sources 120 using binary off/on options. In other instances, the light controller 130 may be used an intensity-based option to increase and decrease the intensity of the light produced by the one or more light sources based on the amount of natural light present within a room where the one or more light sources may be located in.

The light controller 130 may have the ability to automatically adjust the output of the one or more light sources 120 based on chronological time (e.g., time of day), astronomical time (e.g., sunrise and sunset), occupancy using occupancy sensors, daylight availability using the one or more light sensors 140, alarm conditions, or program logic based on a combination of trigger events.

As represented in FIG. 1, the system 100 includes a single light controller 130, but in some implementations, the system 100 may include multiple light controllers 130 based on particular regions within the property (e.g., rooms). In these implementations, the different light controllers 130 may be configured to operate based on the environmental conditions and attributes of the region within the property. For example, a light controller 130 in a living room with high occupancy may be configured to adjust light sources 120 inside the living room to provide greater output than another light controller 130 in a basement with low occupancy.

In other implementations, the multiple light controllers 130 may be configured to exchange communications with the monitor control unit 110 to operate as a distributed network of multiple light controllers that independently control different regions with a single property. In these implementations, the monitor control unit 110 may specify different lighting conditions (e.g., different threshold levels of natural light) for each of the multiple light controllers 130 based on conditions within the different regions such as user preferences in the regions, the number of light sources 120 located in the regions, or sensor data generated by light sensors 140 located in the regions. Additionally or alternatively, the monitor control unit 110 may track occupancy data through the various regions where the multiple light controllers 130 may be located in, and in response, control the distributed network of multiple light controllers 130 based on the expected occupancy of the rooms during particular time periods (e.g., at night).

The one or more light sensors 140 may be photodetectors that sense light or other electromagnetic energy using various types of sensors. For example, the light sensor 140 may be an active-pixel sensor, charged-couple devices (CCDs), photodiode light sensors, or other types of optical detectors. The light sensors 140 may be configured to detect the light produced by the one or more light sources 120 in various regions within the property (e.g., different rooms) as well as natural light from the sun. For example, the one or more light sensors 140 may measure the composition of natural light within various regions of the property to determine if a threshold level of natural light within the property is satisfied so that turning off one or more light sources 120 would still provide sufficient illumination of the property.

In some implementations, the one or more light sensors 140 may be optical spectrum analyzers that may include a broadband spectrometer and wavelength meter to detect the optical spectrum of light from visible light. For example, the one or more light sensors 140 may perform measurements of spectra of the light sensed by the light sensors 140. In some instances, the one or more light sensors 140 may include a diffraction grating 142 to use a grating-based monochromator to mechanically scan the grating and measure relative energies of light at each wavelength. In another instance, the one or more light sensors 140 may include a diffraction grating 142 and a sensor that simultaneously measures the relative energy of diffracted light corresponding to each wavelength.

In some implementations, the one or more light sensors 140 may be used to detect light sources that produce wavelengths above or below the visible light spectrum. In such implementations, the light sensors 140 may be used to detect changes in LEDs or other light source technology. For example, if an ultraviolet LED transmitter was used to excite the phosphor used to generate white light, the light sensors 140 may be capable of analyzing the ultraviolet light produced by the transmitter.

In some implementations, the one or more light sensors 140 may additionally or alternatively distinguish natural light from artificial light based on absorption or reflection profiles for window glass within particular room within the property. The one or more light sensors 140 may be configured to determine an absorption or reflection profile of window glass or the atmosphere, and adjust the expected spectra for natural light based on the absorption or reflection profile. For example, the one or more light sensors 140 may determine that a particular window glass absorbs or reflects light in a particular wavelength range, and in response, reduce the intensity of light for that particular wavelength range in a spectra expected for natural light as sunlight passing through the window glass from outside may have light in the particular wavelength range be absorbed or reflected by the window glass, and use the adjusted spectra for determining an amount of sensed light attributed to natural light and an amount of sensed light attributed to artificial light. In a more particular example, if a particular window glass in a room absorbs and reflects red light, a light sensor may use an absorption profile that indicates that natural light is expected to a have lower intensities in the red light range than natural light would typically be expected to have.

The light sensors 140 may determine the absorption or reflection profile based on calibration. In one example, a user may indicate to the light sensor 140 that a room is currently only illuminated by natural light, and the light sensor 140 may determine an absorption or reflection profile of window glass or the atmosphere based the currently sensed light. In another example, the light sensor 140 may automatically determine that the room is currently only illuminated by natural light based on controlling the one or more light sources 120. In such an example, the light sensor 140 may initially determine that the light sources 120 in the room are currently powered off, and in response, determine that the room is only illuminated by natural light.

In some implementations, the one or more light sensors 140 may exchange communications with incident light meters placed on the windows that measure the intensity of incoming sunlight from outside and provide attributes of the incoming sunlight such as tones, colors, or intensity values. In another example, the one or more light sensors 140 may exchange communications with reflected light meters that may measure the reflectance of the incoming sunlight after it is incident upon the surface of the windows. Multiple incident or reflected light meters may also generate absorption/reflectance profiles for various rooms within the property.

In some instances, the generated absorption/reflection profiles may be used by the components of the system 100 (e.g., monitor control unit 110, one or more light sensors 140, etc.) to distinguish incoming sunlight from the light generated by the light sources 120. For example, the incident or reflectance light meters may initially be calibrated by taking baseline readings when the light sources are turned off to determine the reflectance or absorption due to incoming sunlight. The baseline absorption/reflectance profiles may then be used to operate the one or more light sources 120 by determining, based on the measured absorption/reflectance when the light sources 120 are operating, when the light sources 120 should be enabled or disabled.

The light produced by the one or more light sources 120 may be measured periodically (e.g., one minute intervals, thirty second intervals, or some other time intervals), or measured within a time frame before and during specified time periods (e.g., for the first hour after dawn or from six in the morning to noon) by the home automation system. The measurement of light produced by the one or more light sources 120 the may be triggered to occur based the output of other sensors (e.g., proximity sensors, motion detectors, sound detectors, other types of light detectors, etc.). For example, the light sensor 140 in a room may measure light in response to a motion detector detecting movement in the room. In another example, the light sensor 140 in a room may not measure light white motion is detected in a room and start measuring light periodically while no motion is detected in the room.

The one or more light sources 120, the light controller 130 and the one or more light sensors 140 may communicate with the controller 112 over communications links 122, 124, and 126, respectively, and the light sources 120 may communicate with the light controller 130 over the communication link 128. The communication links 122, 124, 126, and 128 may be wired or wireless data pathways configured to transmit signals between the light sources 120, the light controller 130, and the light sensors 140. The light sensors 140 may periodically transmit sensed values to the controller 112, or may transmit sensed values to the controller 112 in response to a change in a sensed value.

The monitoring system control unit 110 may monitor the operation of the light sources 120, the light controller 130, and the light sensors 140 based on exchanging communications with the light sources 120, the light controller 130, and the light sensors 140. For example, the monitoring system control unit 110 monitor the measured amount of natural light and the composition of ambient light within specified regions of the property from the light sensors 140. In response, the monitoring system control unit 110 may compare the measured amount of natural light to a threshold value to determine if there is a threshold level of natural light within the specified regions within the property. If there is a threshold level of natural light, the monitoring system control unit 110 may transmit a signal directly to the one or more light sources 120 to adjust the settings of the one or more light sources 120, or may transmit a signal to the light controller 130 with an instruction to adjust the settings of the one or more light sources 120.

In some implementations, the light sensor 140 may be built into a standalone light switch. For example, the light controller 130 may be a switch that includes the light sensor 140 and a motion sensor, and operates independently from the monitor control unit 110. In such implementations, the light controller 130 may control the operation of the light sources 120 by performing operations of the monitor control unit 110 related to determining a composition of natural light and artificial light, determining an amount of natural light, determining whether the amount of natural light satisfies a threshold level of natural light, and controlling the operation of the light sources 120.

The one or more mobile devices 150, 160 may be devices that host one or more native applications, e.g., the native applications 152, 162. The one or more mobile devices 150, 160 may be cellular phones or non-cellular locally networked devices. The one or more mobile devices 150, 160 may include a cell phone, a smart phone, a tablet PC, a personal digital assistant ("PDA"), or any other portable device configured to communicate over a network. For example, implementations also may include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 150, 160 may be the same or may include mobile devices of different types. The one or more mobile devices 150, 160 may perform functions unrelated to the system 100, such as placing personal telephone calls, playing music, playing video, displaying pictures, browsing the Internet, maintaining an electronic calendar, etc.

In some implementations, the one or more mobile devices 150, 160 may communicate with and receive data from the monitoring system control unit 110 using the communication link 138. For instance, the one or more mobile devices 150, 160 may communicate with the monitoring system control unit 110 using various local wireless protocols, such as Wi-Fi, Bluetooth, Z-Wave, ZigBee, or wired protocols such as Ethernet, USB, and other wired protocols based on the RS232, RS485, and/or RS422 standards. The one or more mobile devices 150, 160 may connect locally to the system 100 and its sensors and other devices. The local connection may improve the speed of communications because communicating through the network 105 with a remote server may be slower.

Although the one or more mobile devices 150, 160 are shown communicating with the monitoring system control unit 110, the one or more mobile devices 150, 160 may communicate directly with the sensors and other devices controlled by the monitoring system control unit 110. In some implementations, the one or more mobile devices 150, 160 may replace the monitoring system control unit 110 and perform the functions of the monitoring system control unit 110 for local control and long range or offsite communication.

In other implementations, the one or more mobile devices 150, 160 may receive system 100 data captured by the monitoring system control unit 110 through the network 105. The one or more mobile devices 150, 160 may receive the data from the monitoring system control unit 110 through the network 105 or an application server and may relay data received from the monitoring system control unit 110 to the one or more mobile devices 150, 160 through the network 105. In this regard, an application server may facilitate communications between the one or more mobile devices 150, 160 and the monitoring system control unit 110.

Although the one or more mobile devices 150, 160 are shown in FIG. 1 as being connected to the network 105, in some implementations, the one or more mobile devices 150, 160 are not connected to the network 105. In these implementations, the one or more mobile devices 150, 160 may communicate directly with one or more of the system 100 components and no network connection, e.g., connection to the Internet, or reliance on remote servers is needed.

In some implementations, a mobile device 150, 160 may be able to determine a geographic location associated with the mobile device 150, 160, and may communicate information identifying a geographic location associated with the mobile device 150, 160. For example, a mobile device 150, 160 may determine the current geographic location of the mobile device 150, 160 by using global positioning system (GPS) capabilities. In other implementations, a geographic location associated with a mobiles device 150, 160 may be determined using other methods, for example, by using Wi-Fi access point triangulation data, cellular network triangulation data, or IP address information, when the mobile device 150, 160 has network connectivity. The mobile device 150, 160 may transmit data identifying the geographic location of the mobile device 150, 160 over the network 105 to the monitoring system control unit 110.

The one or more mobile devices 150, 160 may each include a native application 152, 162, respectively. The native application 152, 162 refers to a software/firmware program running on the corresponding mobile devices that enables the features described throughout. The one or more mobile devices 150, 160 may load or install the native application 152, 162 based on data received over a network or data received from local media. The native monitoring application 152, 162 may run on mobile devices' platforms, such as Apple iOS, iPhone, iPod touch, Blackberry, Google Android, Windows Mobile, etc.

The native application identifies a geographic location associated with the mobile device 152, 162 and communicates information identifying the geographic location. For example, a mobile device 150, 160 having the native application 152, 162 may determine a geographic location of the mobile device 150, 160 using GPS capabilities, and may communicate data identifying the geographic location to the monitor control unit 110. In some instances, the native application 152, 162 may check the location of the mobile device 150, 160 periodically and may automatically detect when a user associated with the mobile device 150, 160 is going toward or away from a property.

In some implementations, the system 100 may generate light profiles for particular rooms within the property based on historical measurements made by the one or more light sensors 140. For example, the monitor control unit 110 may track the light measurements made by the one or more light sensors 140 over a particular period of time (e.g., six months) to create a light profile for a room that includes trends in the amount of light produced from the light sources 120 or incoming sunlight from the windows. The system 100 may then compare subsequent light measurements to the light profile to determine if there may be a change in the room that may impact the light measurements. For example, if the walls of the rooms are painted, the furniture is reoriented within the room, or the windows are changed, the system 100 may detect a corresponding shift in the light profile based on comparing the light measurements after the change to the light profile. In such examples, the system 100 may re-calibrate the light profile given the adjustments. The light profile may indicate an effect on sensed spectra. For example, a light profile may indicate that the walls of a room are red so that sensed natural light and artificial light that may be reflected off the walls may be expected to have more intensity in wavelengths corresponding to the color red than normal.

Figure 2A:
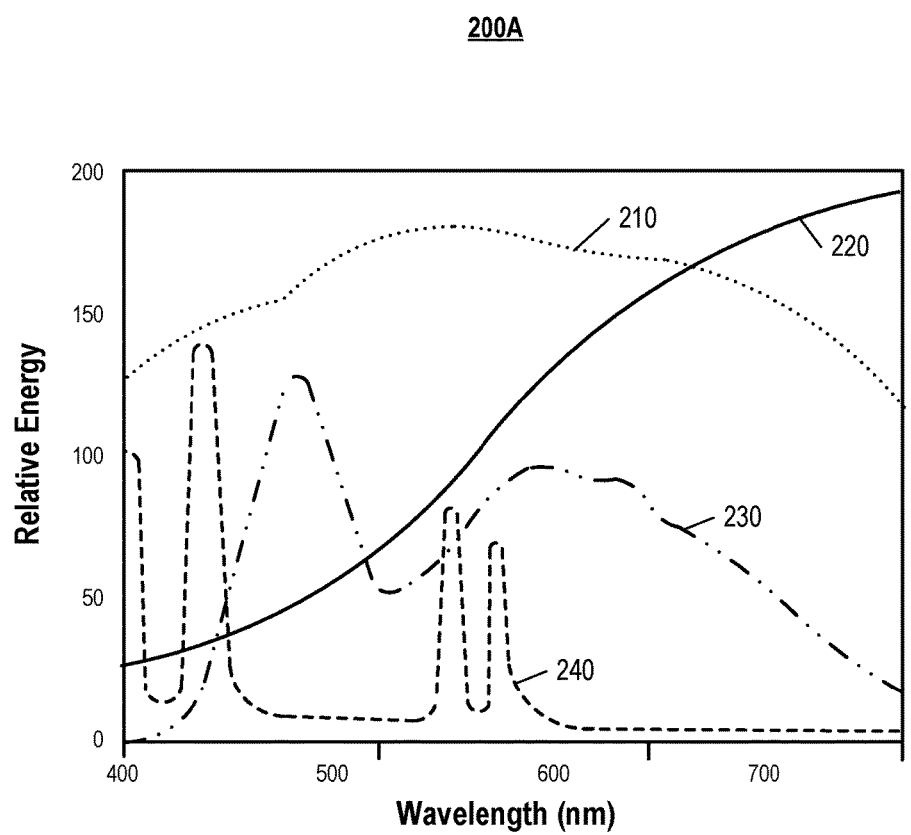
FIG. 2A illustrates example of an optical spectra for common sources of visible light.

FIG. 2A illustrates an example spectra 200A for common sources of visible light. The optical spectra 200A of the light sources represents the relative energy produced by the particular light sources at specified wavelengths. The optical spectra 200A may include light sources such as, for example, sunlight 210, a tungsten lamp 220, a white LED 230, or a mercury-vapor lamp 240.

As indicated in FIG. 2A, the light sources may include signature peaks and troughs that are indicative of optical characteristics of the light produced by the one or more light sources 120 at specified electromagnetic wavelengths. For example, the optical spectra 200A may be used by the light sensors 140 to identify the signature peaks in the wavelengths of ambient light to measure the amount of natural light within specified regions of the property and to determine the composition of natural light within the property. For instance, the light sensors 140 may include a diffraction grating that separates the incident light measured by the light sensors 140 into different wavelengths. The light sensors may then measure relative energies produced by the various light sources at specified wavelengths.

Figure 2B:
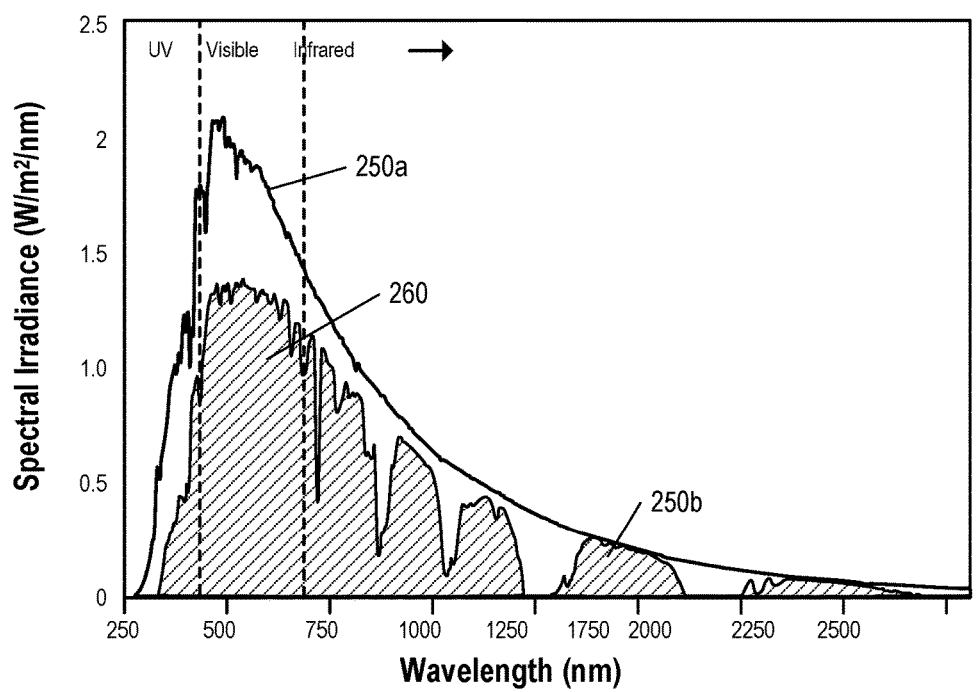
FIG. 2B illustrates an examples for a spectrum of solar radiation.

FIG. 2B illustrates and example spectrum 200B of solar radiation. The spectrum 200B represents the spectral irradiance produced by sunlight at specified electromagnetic wavelengths, which represents the radiant flux of sunlight received by a surface per unit area. The spectrum 200B shows an atmospheric solar radiation 250*a*, sea level solar radiation 250*b*, and absorption bands 260.

As shown in FIG. 2B, the atmospheric solar radiation 250*a* represents the amount of sunlight at the top of the earth atmosphere without absorption. As the solar radiation passes through the atmosphere, sunlight is absorbed by gases such as oxygen or water vapor as shown by the absorption bands 260. The amount of sunlight at the surface of the earth is represented by the sea level solar radiation 250*b*.

In some implementations, the system 100 may utilize the spectrum 200B to determine the absorption and reflection of sunlight on windows on a property. For example, the one or more light sensors 140 may be connected to a spectral irradiance meter that calculates the amount of sunlight absorbed by windows on the property.

Figure 3:
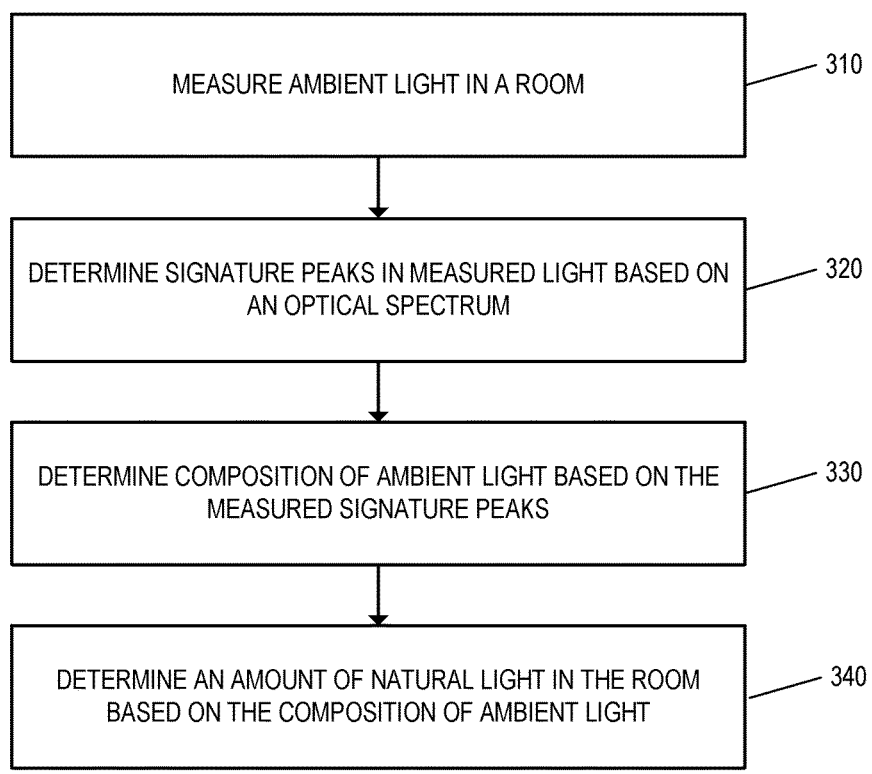
FIG. 3 illustrates an examples of a process for determining the composition of ambient light.

FIG. 3 illustrates an example process 300 that may be used for determining the composition of ambient light. Although the operation of example processes 300-400 are described generally as being performed by the system 100, the operations of the example processes 300-400 may also be performed by one of the components of the system 100 (e.g., the monitoring system control unit 110) or may be performed by any combination of the components of the system 100. In some implementations, operations of the example processes 300-400 may be performed by one or more processors included in one or more electronic devices.

The system 100 may measure ambient light in a room (310). For example, the light sensors 140 may be placed within specified regions of a property to measure ambient light within the property. In some instances, the light sensors 140 may include a diffraction grating 142 to generate an optical spectra of the measured ambient light to identify various light sources within the measured ambient light, including natural light produced by sunlight. For example, the light sensors 140 may use a diffraction grating 142 to separate different wavelengths of light within the measured ambient light. In such examples, the ambient light incident upon the light sensors 140 may strike the diffraction grating and be reflected in a number of directions. For instance, the output light may be created by constructive interference of the reflected light off groves on the diffraction grating 142. As a result, the incident light may be separated into a number of output beams with different wavelengths separated. The light sensors 140 may measure the relative energy of the output beams for the different wavelengths to generate optical spectra of the measured ambient light.

The system 100 may determine signature peaks in measured light based on an optical spectrum (320). For example, the system 100 may determine the measured optical spectrum includes relative peaks at 430 and 525 nanometer wavelengths.

The system 100 may determine composition of ambient light based on the measured signature peaks (330). For example, the system 100 may determine that the ambient light is half from natural light and half from artificial light. The system 100 may determine, based on comparing the peaks and troughs of the generated optical spectra of the measured ambient light and a reference optical spectrum that covers the waveforms of the multiple different type of light sources, the composition of the measured ambient light. For instance, the system 100 may compare the generated optical spectra to characteristic peaks and troughs for specified wavelength of a reference optical spectra, as represented in FIG. 2A, in determining an amount of light from various light sources in the measured ambient light. The system 100 may determine the amount of natural light based on measuring the relative energy produced by natural light within the measured ambient light for specified wavelengths based on the reference optical spectra. For example, the system 100 may identify, from the reference optical spectra, different relative energy for light from different light sources at different wavelengths, and determine a ratio of an amount of light from the different light sources that results in a spectra that best matches the generated optical spectra from the sensed ambient light across the wavelengths. In another example, the system 100 may consider one or more particular peaks. For example, as indicated in FIG. 2A, sunlight 210 has broad peaks with max relative energy around 520-550 nm. The system 100 may calculate the ratio of the relative energy produced by natural light and the total relative energy of the measured ambient light at these wavelength ranges. In calculating the relative energy, the system 100 may use a variety of light measuring metrics such as illuminance, luminous emittance, or radiometric measurements based on the physical power produced by the one or more light sources 120.

The system 100 may determine an amount of natural light in the room based on the composition of ambient light (340). For example, the system 100 may determine twenty lux of the ambient light is from natural light. The system 100 may determine the amount of natural light in the room based on the composition of ambient light and the amount of total light sensed by a sensor. For example, the system 100 may determine that a composition of light sensed by a light sensor is half from natural light and half from artificial light, determine that there is a total of forty lux sensed by the light sensor, and determine that there is twenty lux of natural light based on applying the ratio of natural light versus total light to the total amount of light sensed.

Figure 4:
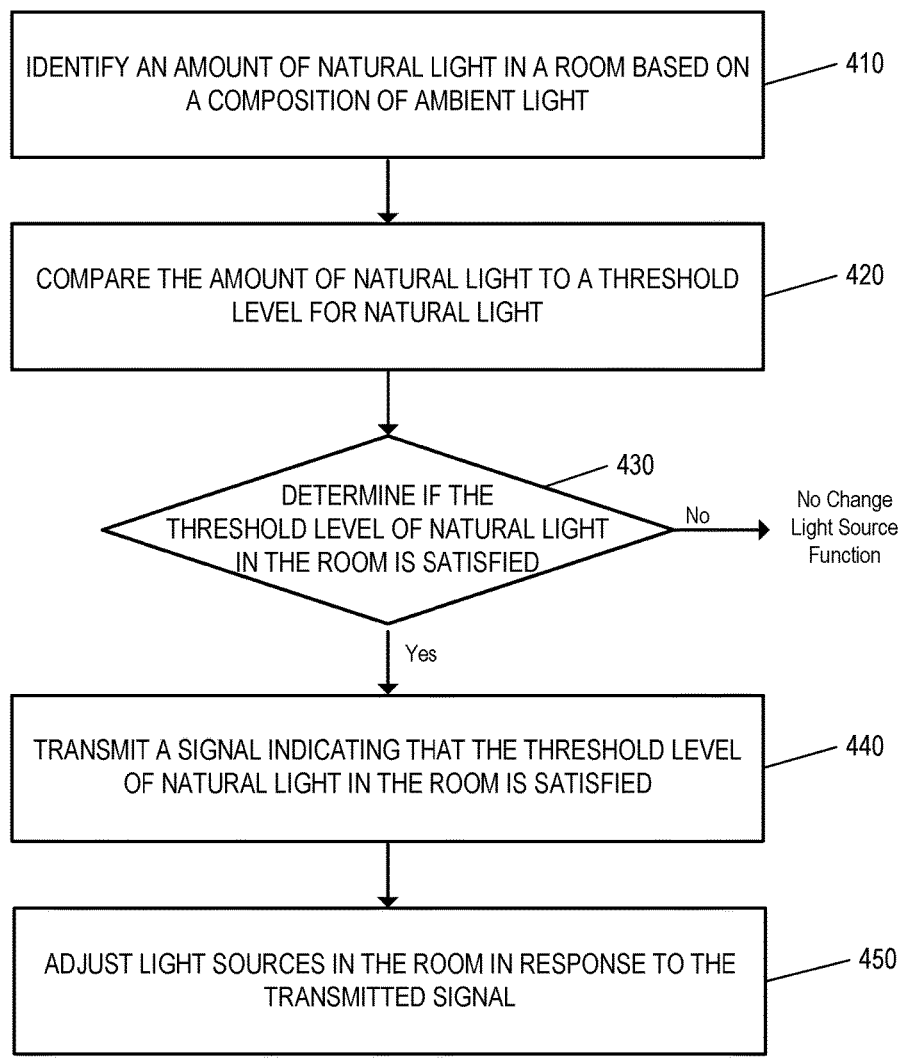
FIG. 4 illustrates an example of a process for automatically controlling light sources.

FIG. 4 illustrates example process 400 for automatically controlling light sources. The system 100 may initially identify an amount of natural light in a room based on a composition of ambient light (410). For example, as described in FIG. 3, the system 100 may generate a ratio of relative energy produced by natural light compared to the total relative energy produced by artificial light, e.g., the light sources 120. The relative natural light ratio may indicate the portion of the measured ambient light that results due to natural light sources such as sunlight. In another example, the system 100 may determine the amount of natural light based on comparing the ratio to the total amount of light.

The system 100 may compare the amount of natural light to a threshold level for natural light (420). For example, the system 100 may compare a determined amount of twenty lux of natural light to a threshold level of forty lux of natural light. In some implementations, the system 100 may vary the threshold level. For example, the system 100 may initially determine a threshold level for a sufficient amount of natural light based on environmental conditions surrounding the property, time conditions, or occupancy data. For instance, the system 100 may use occupancy data to determine if users are inside the property and may be using appliances or other light sources that may require a higher threshold level for natural light and accordingly set a higher threshold level. In some implementations, the system 100 may instead compare a ratio of the natural light compared to the measured ambient light, to the threshold level for natural light.

The system 100 may determine if the threshold level of natural light in the room is satisfied (430). For example, if the measured amount of natural light does not exceed a threshold level for natural light, then the system 100 may not change the light source function, e.g., may leave the light sources on. Alternatively, if the measured amount of natural light exceeds the threshold level for natural light, the system 100 may determine that there may be sufficient natural light present within the room of the property.

In some implementations, the system 100 may also consider external factors beyond the comparing the measured amount of natural light to the threshold level for natural light in determining if the threshold level for natural light is satisfied. For instance, the system 100 may consider the placement of the light sensors 140 within the room within the property (e.g., living room, bed room, kitchen, etc.), user preferences indicated by routine usage patterns, the amount of luminous emittance in the room based on the size and number of windows present, among other factors. In such instances, the system 100 may intelligently determine whether a user would consider the room within the property to be properly illuminated based on the amount of natural light entering the region.

In some implementations, the system may use a luminosity function, which describes the average spectral sensitivity of user visual perception of brightness, to adjust the determination of whether the threshold level for natural light within the region is satisfied. For example, the system may calculate a photopic luminosity function that approximates the response of the human eye to varying degrees of perceived brightness. In this example, the system 100 may calculate the luminous flux of the one or more light sources using the spectral power distribution of the light produced and the wavelength of the light produced.

The system 100 may transmit a signal indicating that the threshold level of natural light in the room is satisfied (440). For example, in response to determining that the threshold level of forty lux of natural light within a room within the property is satisfied by a determined amount of forty-five lux of natural light, the system 100 may transmit a signal to the light controller 130 within the room indicating that the threshold level for natural light is satisfied. In other instances, the signal may also be transmitted to the monitor control unit 110, which may store the transmission in a usage history.

The system 100 may adjust light sources in the room in response to the transmitted signal (450). For example, the light controller 130 may control the operations of the one or more light sources 120 that may produce light within a room within the property based on receiving a signal transmission indicating that the threshold level for natural light within the region is satisfied. In some instances, the light controller 130 may adjust the operation of the light sources 120 using a binary on/off mechanism. In such instances, the light controller 130 may turn off one or more light sources 120 to conserve energy if the amount of natural light is sufficient to illuminate the particular region. In other instances, the light controller 130 may use an intensity-based mechanism to increase or decrease the intensity of the light produced by the one or more light sources 120. In such instances, the light controller 130 may adjust the power of the one or more light sources 120 and measure the corresponding reduction of light produced by the one or more light sources 120 in relation to the amount of natural light present within the region.

Figure 5:
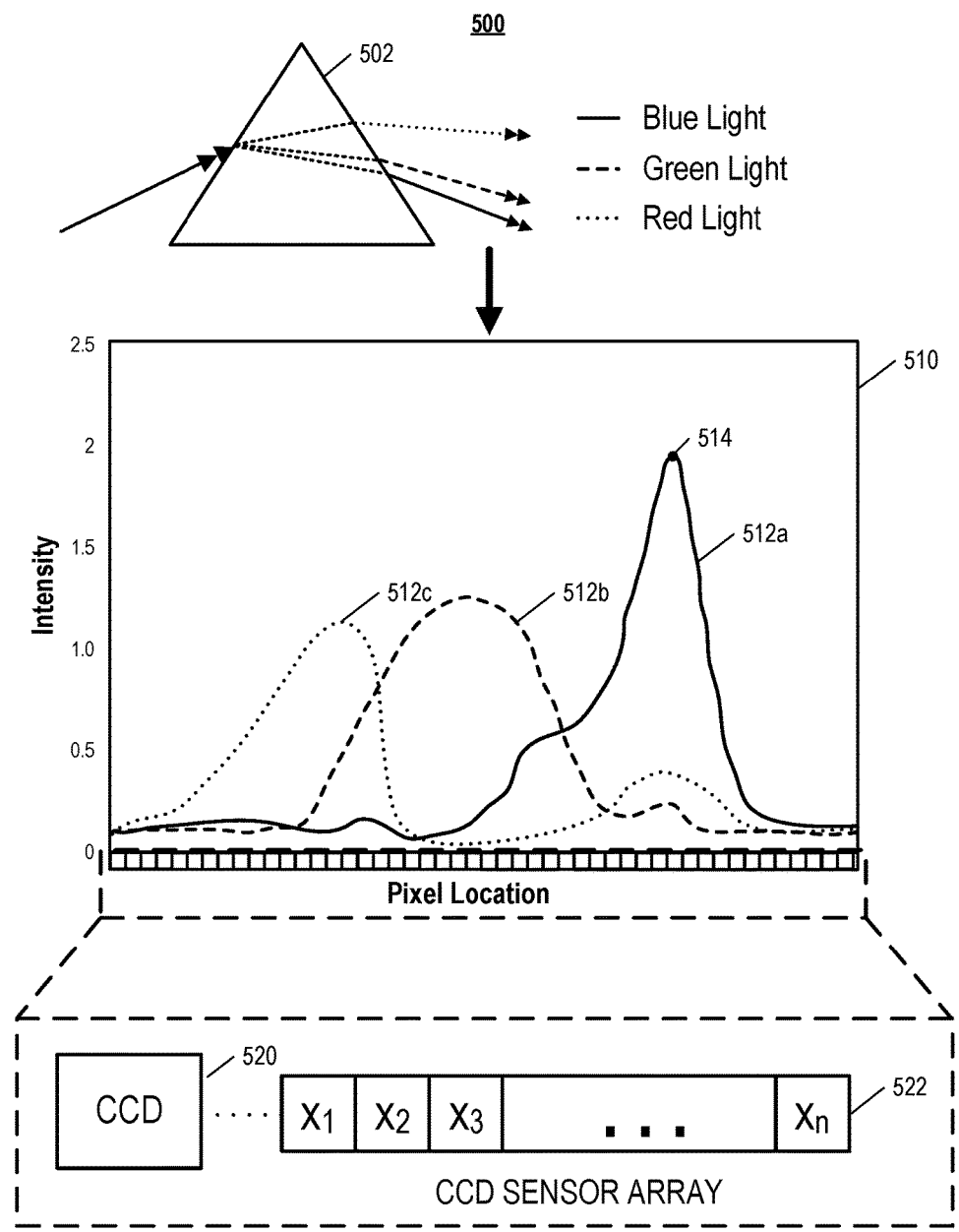
FIG. 5 illustrates an example of a technique for analyzing optical spectra of components of white light.

FIG. 5 illustrates an example of a diagram 500 for analyzing optical spectra of components of light. Initially, light may be passed through a spectrograph 502 that disperses the light into separate colored light components. Intensity measurements of each colored component may then be measured using a charged couple device (CCD) 520 that includes a sensory array 522. The intensity data collected by the CCD 520 is then used to generate optical spectra for each colored light component.

In more detail, the spectrograph 502 may be any type of apparatus that is capable of separating light into components using for example, dispersion or refraction techniques, and then measuring properties of particular portions of the light using one or more light detectors. For instance, the detectors may be used to detect intensities of colored components at different wavelengths that make up white light. In the example, the spectrograph 502 receives white light that is incident upon a surface of a triangle prism. The white light then separates into different colors due to dispersion inside the spectrograph 502, and blue light, green light, and red light exit the triangular prism to be collected for analysis by the CCD 520.

The CCD 520 may be an electronic device that includes sensors to detect the intensity of components of light exiting the spectrograph 502. For instance, the CCD 520 may include a sensor array 522 that includes a plurality of pixels that are capable of sensing the intensity of light and representing the intensity as a pixel value. In the exampled depicted in FIG. 5, the sensor array 522 may be used to generate an optical spectrum for the intensity of each component of light where the pixel location within the pixel array may be used to determine a wavelength and the pixel value may be used to determine a pixel intensity.

The generated optical spectra 510 may include an individual optical spectrum for each component of light corresponding to a particular color of light (e.g., blue light, green light, red light). In the example, the optical spectra 512a, 512b, and 512c correspond to red light, green light, and blue light, respectively of a white light light-emitting diode (LED) source. In addition, each of the optical spectra 512a, 512b, and 512c may include an associated peak point intensity 514, which refers to the wavelength, indicated by the pixel location within the sensory array 522, associated with the peak intensity of the optical spectra, indicated by the pixel value of the pixel associated with peak intensity point.

Figure 6:
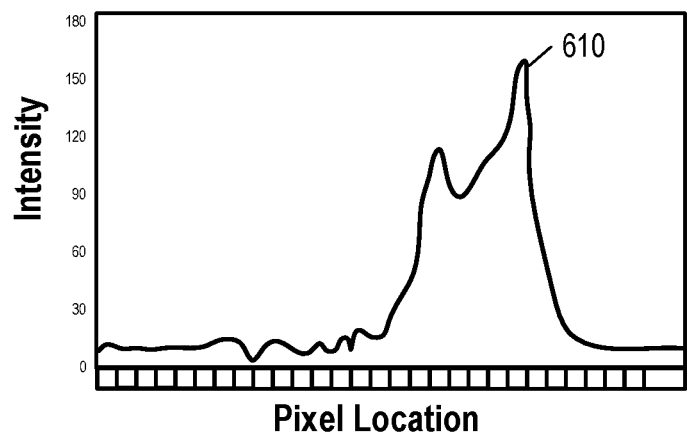
FIG. 6 illustrates examples of optical spectra for different sources of light.
Figure 6:
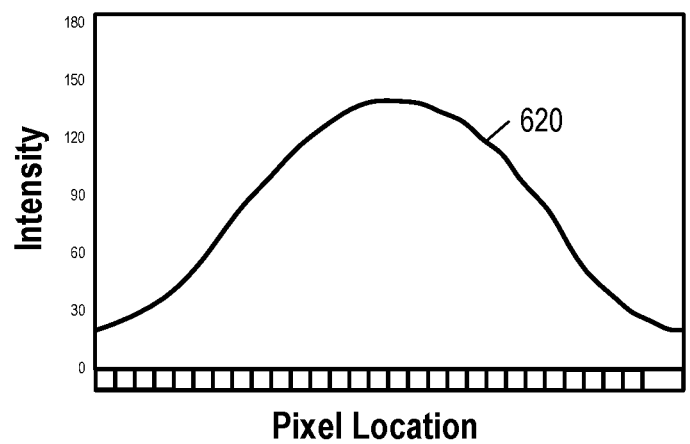
Figure 6:
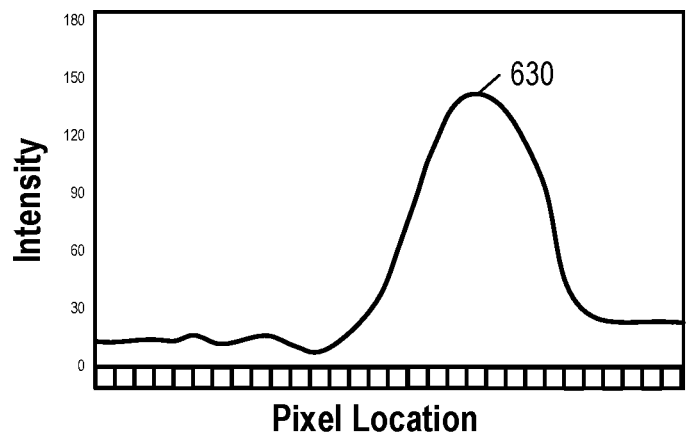

FIG. 6 illustrates examples of optical spectra for different sources of light. For instance, optical spectrum 610 is generated for blue light detected in light from a fluorescent light source, optical spectrum 620 is generated for blue light detected in light from sun light, and optical spectrum 630 is generated for blue light detected in light from a halogen light source.

In general, the optical spectra 610-630 may be used to distinguish between various sources of artificial light (e.g., LEDs, halogen light source, etc.) and natural sunlight in order to perform various monitoring operations as described previously with respect to FIG. 1. For example, attributes of the optical spectra such as peak intensity, sharpness of peaks, among others, may be used to identify the types of light sources that provide light within a property. For example, LED light sources may be distinguished from other types of light sources (e.g., incandescent light sources, halogen light sources) because the optical spectra of LED light sources have a relatively sharp peak in the intensity of blue light compared to peaks for blue light in other types of light sources. In another example, fluorescent light sources have two peaks in blue light, which may be used to distinguish against natural sunlight and other artificial light sources that may only have a single peak in the blue light spectrum.

In the examples depicted in FIG. 6, optical spectra of blue light such as the optical spectra 610-630 may be used to distinguish between different light sources based on peak sharpness as well as the number of peaks in blue light. In other implementations, the optical spectra for other light components, or a combination of different components may also be used in the analysis.

After generating the optical spectra 610-630, a variety of analysis techniques may be used to identify the type of light source associated with the detected light of the optical spectra 610-630. In one example, the peak intensity point for each spectrum may initially be determined based on identifying the particular sensor within the sensor array 522 that detects the highest intensity, indicated by the highest pixel value. Given the pixel location of the sensor peak intensity point, a particular pixel offset value may then be used to determine intensity values measured by sensors that are located at the positive and negative offsets from the pixel location of the peak intensity point. The intensity values at the offset pixel locations may then be subtracted from the peak intensity value and divided by the value of the pixel offset. The result may reflect an individual rising slope of the negative pixel offset and falling slope of the positive pixel offset. In some instances, this process may be repeated using different pairs of pixel offsets, and the individual slope measurements for each pair of pixel offsets may then be added together to determine the absolute sum of slopes of the intensity peak (or spectral response) of the detected light source.

In some implementations, the particular pixel offset value may be set to a particular value based on the number of pixels included within the sensor array 522 (e.g., four percent of the number of pixels that receive visible light wavelengths if the full visible light spectrum is projected through spectrograph 502). In such implementations, thresholds for calculated rising and falling slopes may be used to determine a classification of the light source of the detected light by the sensor array 522.

In one particular implementation, the techniques described above may be performed using a sensory array that includes a one-dimension array of five hundred twelve sensors. In such an implementation, the pixel offset may be set to 20 pixels such that if the calculated absolute sum of slopes, as described above, is greater than 0.75, then the light source is determined to either be an LED light source, a fluorescent light source, or a halogen light source. Alternatively, if the absolute sum of slopes is determined to be less than 0.75, then the light source is determined to be either sun light or an incandescent light source. In such implementations, once the absolute sum of slopes is determined to be greater than 0.75, a secondary analysis for an additional peak at longer wavelengths may be used to distinguish between fluorescent light sources from LED light sources since fluorescent light sources may often include multiple peaks in the blue spectrum (e.g., optical spectrum 610). For the secondary analysis, an additional slope calculation technique on the primary peak using a smaller offset (e.g., 2% offset) may be used to determine if the light source is instead a halogen light source.

Figure 7:
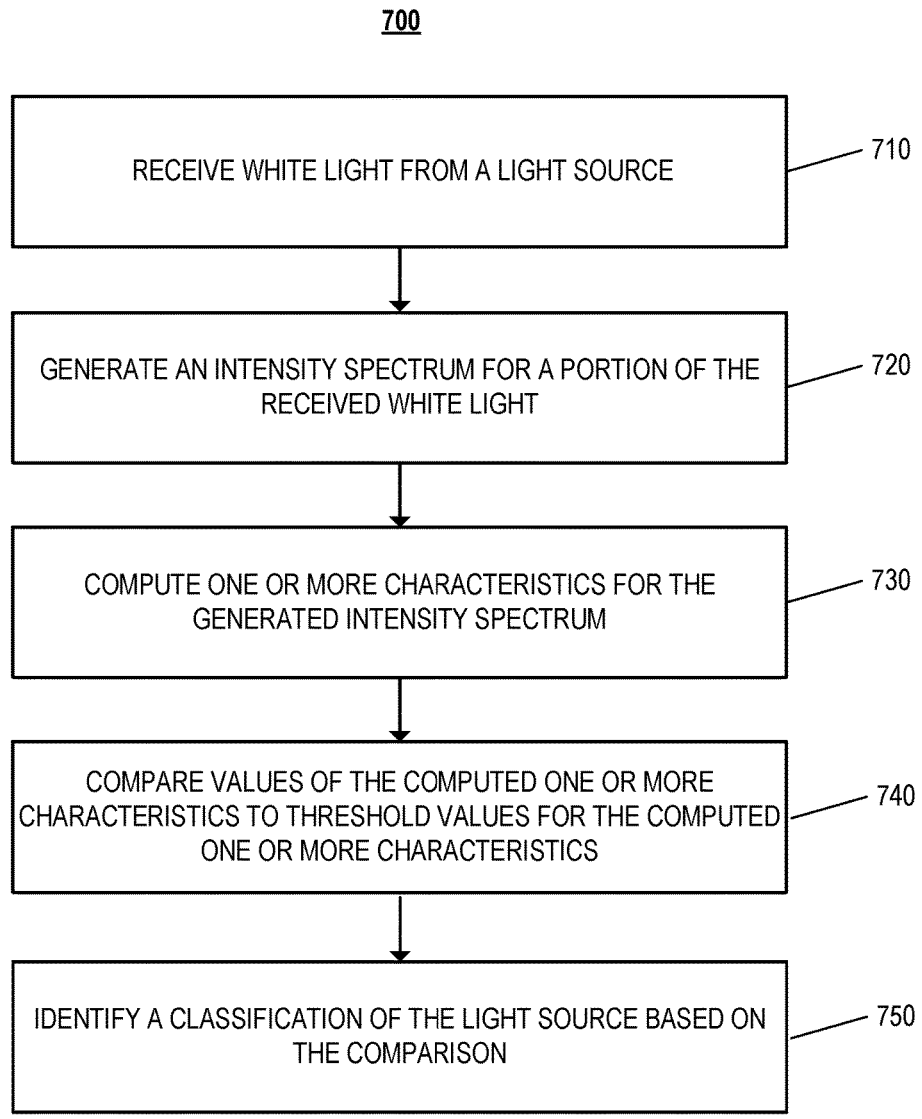
FIG. 7 illustrates an example of a process for identifying a classification of a light source.

FIG. 7 illustrates an example process 700 for identifying a classification of a light source. Briefly, the process 700 may include receiving light from a light source (710), generating an intensity spectrum for a portion of the received light (720), computing one or more characteristics for the generated intensity spectrum (730), comparing values of the one or more characteristics to threshold values for the computed one or more characteristics (740), and identifying a classification of the light source based on the comparison (750).

In more details, the process 700 may include receiving light from a light source (710). For instance, as described previously, the spectrograph 502 may receive an incident beam of white light from a light source. The light source may either be a natural light source such as sunlight or an artificial light source such as a LED light source, a halogen light source, or an incandescent light source. In some instances, the light may include light from a variety of light sources (e.g., light generated from a lamp inside a property and sunlight entering into the property through one or more windows).

The process 700 may include generating an intensity spectrum for a portion of the received white light (720). For instance, the spectrograph 502 may initially use light separation techniques to separate individual components of white light (e.g., blue light, red light, green light). Each individual component of light may be collected in an apparatus that includes the CCD 520 to detect the intensity of each individual component for various wavelengths of light. As described previously with respect to FIG. 5, the intensity measurements by the sensor array 522 may be used to generate an optical spectrum for each component of white light.

In some implementations, the CCD 520 may use multiple pixel data at the same wavelength of light to increase the signal-to-noise ratio of the CCD 520, or increase the ability to obtain useful spectrum data at low light levels or under conditions where the CCD 520 is not located in an optimal location to receive light from all light sources located inside a region of a property.

The process 700 may include computing one or more characteristics for the generated intensity spectrum (730). For instance, after generating the optical spectrum for each individual component of white light, the peak intensity point of each optical spectrum may be identified based on the highest pixel value within each optical spectrum. The absolute sum of slopes for each optical spectrum may then be calculated using techniques described previously with respect to FIG. 6.

The process 700 may include comparing values of the one or more characteristics to threshold values for the computed one or more characteristics (740). For instance, the calculated value of the absolute sum of slopes may be compared to a threshold value in order to identify the light source that generated the detected individual light component of the white light.

The process 700 may include identifying a classification of the light source based on the comparison (750). For instance, as described previously with respect to FIG. 6, a threshold of 0.75 may be used to determine if a light source is either sunlight or an incandescent light source (e.g., below 0.75) or an LED light source, a halogen light source, or a fluorescent light source.

Figure 8:
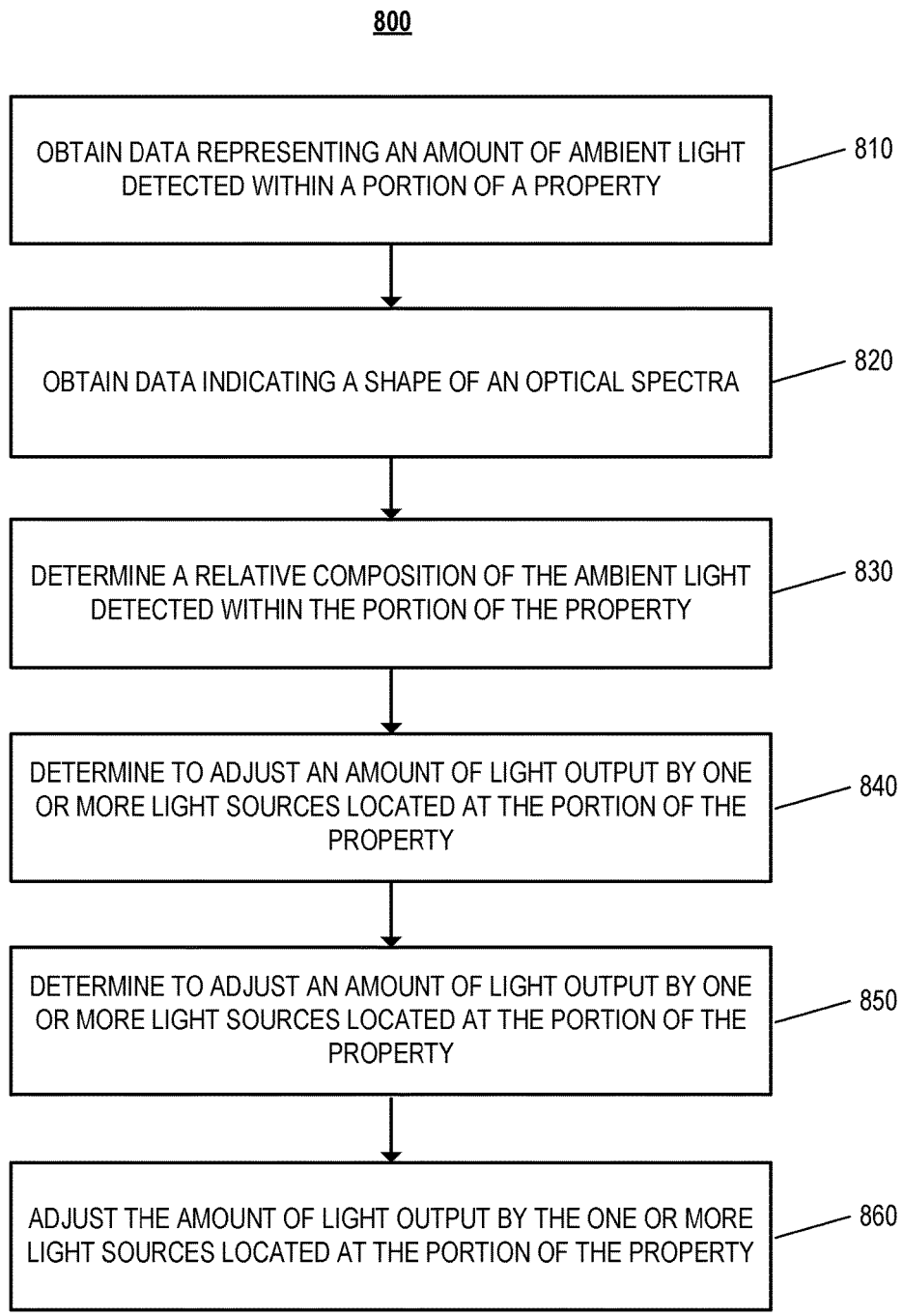
FIG. 8 illustrates an example of a process for performing an action based on a determined relative composition of light.

FIG. 8 illustrates an example of a process 800 for performing an action based on a determined relative composition of light. Briefly, the process 800 may include obtaining data representing an amount of ambient light detected within a portion of a property (810), obtaining data indicating a shape of an optical spectra (820), determining a relative composition of the ambient light detected within the portion of the property (830), determining an estimated amount of natural light within the portion of the property (840), determining to adjust an amount of light output by one or more light sources located at the portion of the property (850), and adjusting the amount of light output by the one or more light sources located at the portion of the property (860). While the monitor control unit 110 is described as performing the process 800, some or all of the process 800 may be performed by the light sensor 140 or the light controller 130, alone or in combination with the monitor control unit 110.

Figure 9:
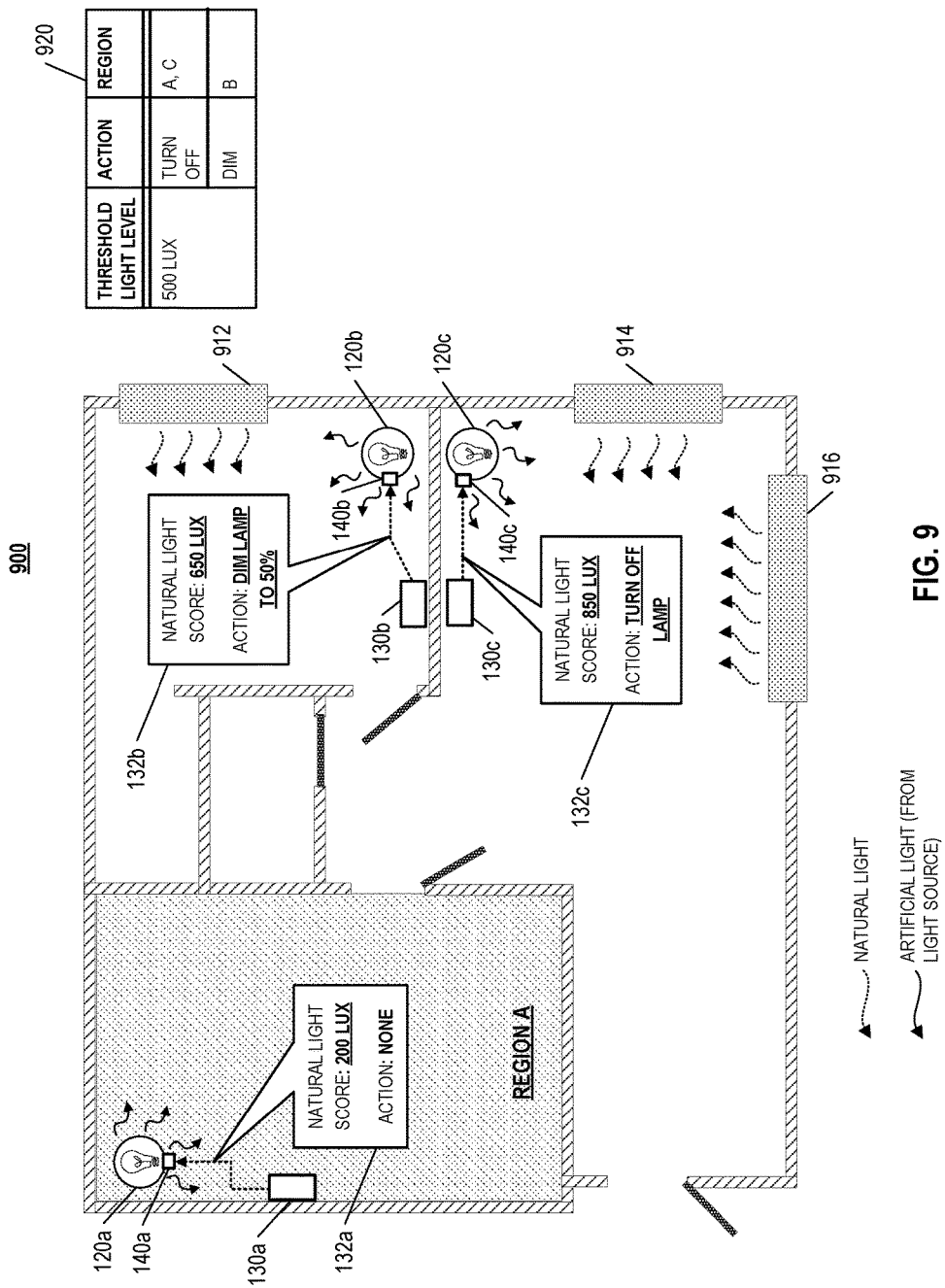
FIG. 9 illustrates an example of a property in which natural light is measured in different regions of the property.

In more detail, the process 800 may include obtaining data representing an amount of ambient light detected within a portion of a property (810). For instance, the monitor control unit 110 may obtain data representing an amount of ambient light detected within a portion of a property (e.g., a particular region within the property 900 as depicted in FIG. 9) from the light sensor 140 located within the portion of the property. As described previously with respect to FIG. 3, the light sensors 140 may include a diffraction grating 142 that generates an optical spectra of the measured ambient light within a portion of the property and the data representing an amount of ambient light may represent that detected optical spectra.

The process 800 may include obtaining data indicating a shape of an optical spectra (820). For instance, the monitor control unit 110 may obtain data that indicates signature peaks within an optical spectra for a natural light source and signature peaks within an optical spectra for a non-natural light source. The different optical spectra with different signature peaks may be distinctive for different types of light sources. For example, as described above, natural sunlight may have distinctive peaks (which may vary based on weather conditions, time of year, etc.) and different types of non-natural light may have different distinctive peaks. The data indicating signature peaks may be obtained from optical spectra that are stored and constant. In another implementation, the data indicating signature peaks may be obtained during a calibration process. For example, a user may indicate that that there is only natural light present and the monitor control unit 110 may determine the spectra for the currently detected ambient light and store that spectra labeled as an optical spectra for natural light and at another time indicate that there is only non-natural light present and the monitor control unit 110 may determine the spectra for the currently detected ambient light and store that spectra labeled as an optical spectra for non-natural light.

The process 800 may include determining a relative composition of the ambient light detected within the portion of the property (830). For instance, the monitor control unit 110 may determine the relative composition using techniques described previously with respect to FIGS. 3 and 4. As an example, the monitor control unit 110 may generate a ratio of relative energy produced by natural light compared to the total relative energy produced by artificial light, e.g., by the light sources 120. The relative natural light ratio may be used to indicate the portion of the measured ambient light that results due to natural light sources such as sunlight.

The process 800 may include determining an estimated amount of natural light within the portion of the property (840). The monitor control unit may determine an estimated amount of natural light within the portion of the property based on the amount of ambient light detected within the portion of the property and the determined relative composition of the ambient light detected within the portion of the property. For example, the monitor control unit 110 may determine 30% of ambient light is natural light, determine that there is forty lux, and in response, determine that there is twelve lux of natural light. Additional examples of such techniques are described previously with respect to FIGS. 3 and 4.

The process 800 may include determining to adjust an amount of light output by one or more light sources located at the portion of the property (850). For instance, the monitor control unit 110 may determine that the detected amount of natural light within the portion of the property satisfies a predetermined threshold for the amount of natural light within the portion of the property, and in response, determine to adjust an amount of light output by the light sources 120 within the portion of the property. As described previously with respect to FIG. 9, the adjustment may be a binary adjustment (e.g., turning a particular light source on or off), or a commensurate adjustment (e.g., a reduction in power for a particular light source to dim the amount of light produced). For example, the monitor control unit 110 may enforce a minimum of four hundred lux in a room and as the amount of natural light increases the monitor control unit 110 may dim a light source so that that light source provides a different between four hundred lux and the amount of lux provided by natural sunlight.

The process 800 may include adjusting the amount of light output by the one or more light sources located at the portion of the property (860). For instance, the monitor control unit 110 may transmit signals including the determined adjustment to the light sources 120 directly, or to the light controller 130, which then transmits the instructions to the light sources 120. FIG. 9 depicts examples of different instruction transmission mechanisms 132a-c that may be used by the monitor control unit 110.

In some implementations, the process 800 may include determine a relative composition of the ambient light using additional or alternative features of optical spectra. For example, the monitor control unit 110 may obtain a shape of an optical spectra for a natural light source, a shape of an optical spectra for a non-natural light source and use those shapes similarly to how use of signature peaks are described above for process 800. Additionally or alternatively, the process 800 may include obtaining signature valleys of an optical spectra for a natural light source and obtaining signature valleys of an optical spectra for a non-natural light source and use those shapes similarly to how use of signature peaks are described above for process 800.

As previously indicated, the process 800 may be entirely performed by a single device that includes a light sensor and a light controller for a light source. In the implementation, once the single device determines to adjust an amount of light output by one or more light sources located at the portion of the property, the single device may adjust the amount of light output by, for example, reducing an amount of power that the single device outputs to a light source.

FIG. 9 illustrates an example of a property 900 in which natural light is measured in different regions of the property. As depicted, the property 900 generally includes regions A, B, and C representing different portions of a property that include two bedrooms and a common living room area. The regions A, B, and C respectively include light sources 120a, 120b, 120c, light sensors 130a, 130b, 130b, and light controllers 140a, 140b, and 140c. In some implementations, the light sources 120a-c, the light sensors 130a-c, and the light controllers 140a-c may be components of the system 100 as described previously with respect to FIG. 1 (e.g., the light sensors 120, the light sensors 130, and the light controllers 140).

In general, the light sensors 130a-c may be configured to estimate an amount of natural light that is present within a corresponding region of the property 910. For instance, the light sensors 130a-c may initially measure the amount of ambient light detected within the corresponding region, identify a relative composition of natural light within the detected amount of ambient light, and then estimate the amount of natural light within the region using techniques described previously with respect to FIGS. 3, 4, and 8. The light sensors 130a-c may then transmit data indicating the estimated amount of natural within the region to various devices over the network 105. In some instances, the amount of natural light estimated by the different light sensors 130a-c may be transmitted to corresponding light controllers 140a-c associated with a set of light sources 120a-c. In such instances, the light sensors 130a-c may include decision engines that are capable of performing processing operations described previously with respect to FIGS. 3, 4, and 8 and then transmitting signals 132a, 132b, and 132c, respectively, to the corresponding light controllers 140a-c. In other instances, the light sensors 130a-c may transmit the computed data to a single component (e.g., the monitor control unit 110), which then performs the processing operations based on the amount of natural light estimated by each of the light sensors 130a-c.

The light controllers 130a-c may each transmit different signals to the light controllers 140a-c based on comparing the estimated amount of natural light within a particular region of the property 910 to a predetermined threshold for the particular region. The predetermined threshold may be varied for each region, or configured to be the same for each region. In addition, as described more particularly with respect to FIG. 10, the predetermined threshold may be configured by a user, or dynamically adjusted throughout certain periods based on conditions associated with the property (e.g., time of day, external weather conditions, user-defined preferences, etc.).

In the examples depicted in FIG. 9, the light sensors 130a-c transmit signals to the light controllers 140a-c, respectively, based on the configuration 920, which specifies a threshold natural light level of five hundred lux, and specifies region-specific actions to perform in response to determining that the threshold has been satisfied. In this example, the threshold corresponds to a level of illuminance (e.g., total luminous flux on a surface per unit area) recommended for an interior area for performing normal office work.

The configuration 920 specifies different signaling mechanisms to adjust the operation of each of the light sources 120a-c based on the amount of natural light estimated by each of the light sensors 130a-c. In some instances, the configuration 920 specifies a binary signaling mechanism to power light sources on or off based on the detected amount of natural light (e.g., regions A and B). In other instances, the configuration 920 instead specifies a signaling operation that adjusts the power output of the light sources in order to reduce the amount of light produced commensurate with the amount of detected natural light relative to the specified threshold (e.g., region C).

Referring initially to region A, the light sensor 130a estimates that amount of natural light in the region is two hundred lux, which is below the threshold of five hundred lux specified by the configuration 920. In response to determining that the estimated amount is below the predetermined threshold, the light sensor 130a transmits a signal 132a with an instruction to maintain the operation of the light source 140a to ensure that a sufficient amount of ambient light is present within the region and may not transmit a signal to turn off the light source 140a.

Referring now to region C, the light sensor 130c detects that the amount of natural light is 850 lux, which is above the threshold specified by the configuration 920. In this example, the light sensor 130c transmits a signal 132c with an binary instruction to turn off the light source 120c based on determining that there is sufficient level of natural light entering into the region through windows 914 and 916.

Referring now to region B, the light sensor 130b detects that the amount of natural light is 650 lux, which is also above the threshold specified by the configuration 920. In contrast with the operation of the light sensor 130c that transmits a binary signal, the light sensor 130b instead transmits a signal 132b with an instruction to dim the light source 120c to a level that may be based on the difference between the predetermined threshold and the estimated amount of natural light by the light sensor 130c (e.g., 15% decrease in power output of the light source 120c in response computing a 15% increase in the amount of natural light entering the region compared to the predetermined threshold).

In some implementations, the configuration 920 also specifies a hybrid signaling mechanism that combines the aspects of the exemplary signaling mechanisms illustrated in FIG. 9. For example, the hybrid signaling mechanism may specify a commensurate adjustment of light source operation for a particular range of the detected amount of natural light relative to the predetermined threshold (e.g., with a negative to positive two hundred lux difference from the predetermined threshold), and a binary adjustment of light source operation for any detected amount outside the particular amount (e.g., a negative three hundred lux difference, or a positive four hundred lux difference). In this regard, the configuration 920 may be used to provide energy-efficient adjustments to operation of light sources without necessarily impacting a user's experience when located within the region.

In some implementations, the configuration 920 may specify dynamic adjustments to the signaling mechanism of the light sensors 130a-c based on one or more conditions associated with the property (e.g., external weather conditions, time of day, user-specific settings, etc.). For example, the configuration 920 may specify a binary adjustment mechanism for a particular light source if the ambient weather conditions indicate rain, and a commensurate adjustment mechanism for the same light source if the ambient weather conditions instead indicate sunny conditions. In these examples, the sensitivity of the adjustment technique may be optimized based on exterior conditions in order to minimize energy consumption while minimizing the amount of operational changes to the light sources.

Figure 10:
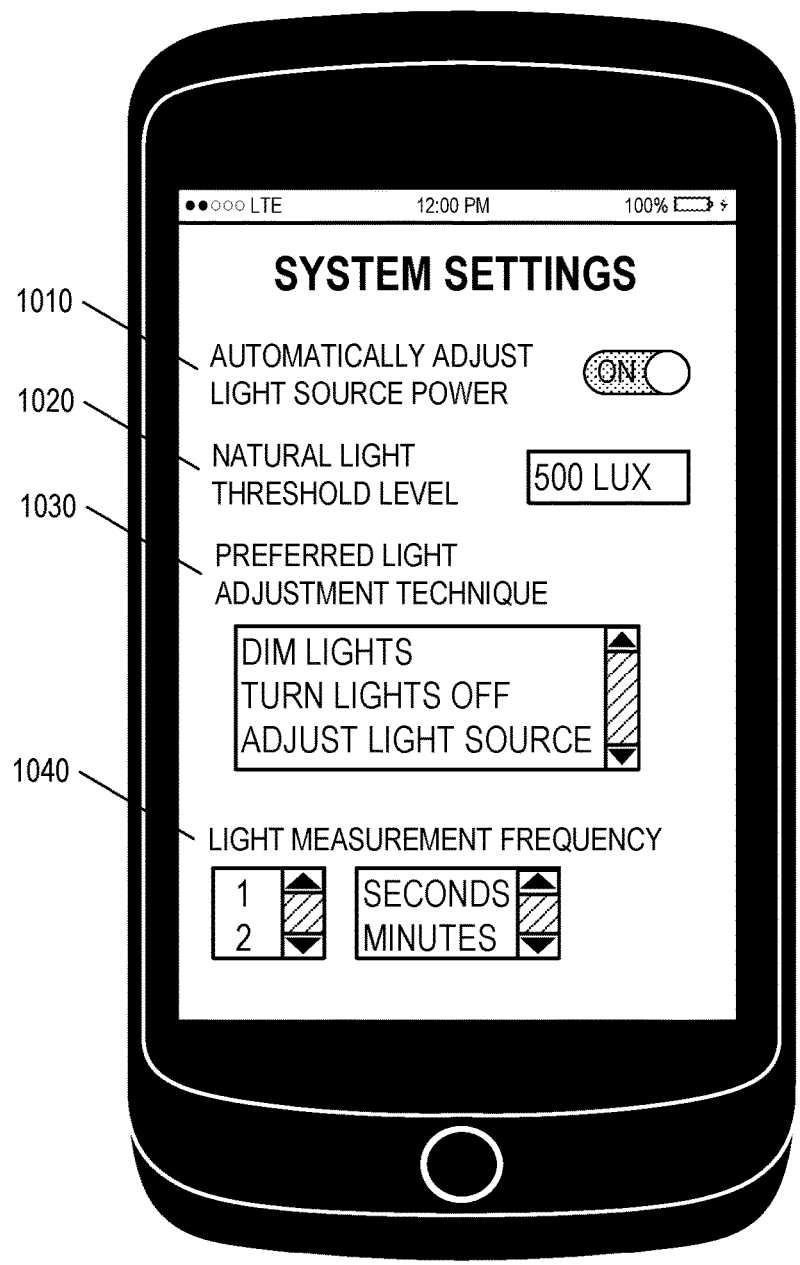
FIG. 10 illustrates an example of a user interface to adjust settings related to automatically controlling light sources.

FIG. 10 illustrates an example of a user interface 1000 to adjust settings related to automatically controlling light sources. As depicted, the interface 1000 includes a set of configuration settings 1010-1050 that control the operation of components of the system 100.

The setting 1010 allows a user to configure whether the system 100 automatically adjusts the operation of the light sources 120 within a property based on the data collected by the sensors 130. For example, if a user chooses to enable the setting 1010, then the light sensors 130 may periodically monitor the ambient light entering into a property in order to automatically adjust operation of the light sources 120 without any user intervention.

The setting 1020 allows a user to configure a predetermined threshold used by the system 100 to determine when to adjust the operation of the light sources 120. For instance, as described previously, the light sensors 130 may compute an amount of natural light that enters a region of the property, compare the computed amount to the predetermined threshold, and then perform one or more specified actions (e.g., turning off a particular light source, dimming a particular light source, etc.). In this regard, the setting 1020 allows the user to configure a certain level of brightness associated with the property. In some implementations, the setting 1020 may additionally or alternatively provide the user with a sliding scale that identifies "DARK" and "BRIGHT" ends and allows the user to configure the predetermined threshold between the two ends.

The setting 1030 allows a user to configure particular actions to be taken by the system 100 in response to detecting that the amount of natural light entering into a region of the property exceeds the predetermined threshold as specified in the setting 1020. For instance, as described previously with respect to FIG. 9, in some instances, the system 100 may use an adjustment technique that dims the power of the light sources 120 commensurate with the difference between the detected amount of natural light and the predetermined threshold. In other instances, the system 100 may use an adjustment technique turns the light sources 120 on and off based on the detected amount of light.

In some implementations, the setting 1030 may provide options for the user to customize system actions in response to determining that the detected amount of natural light exceeds the predetermined threshold. Examples may include specifying an order of preference for turning certain lights off if there are multiple light sources within a particular region, specifying a change to the color of light produced by a particular light source, indicating regions of preference where energy consumption may be more important, among other types of features.

The setting 1040 allows a user to configure the frequency and the time periods in which the system 100 detects the amount of natural light entering into regions of the property. The frequency and time periods may be configured based on a user's anticipated periods of peak energy consumptions (e.g., evenings when occupants are at home and there is low ambient light entering from the exterior), or potential changes in the amount of natural light entering into the property based on certain changes in external conditions of the property (e.g., sunrise, sunset, weather change from cloudy to sunny, etc.). In this regard, the user may wish to configure high frequency light measurements during times of significant changes to the amount of ambient light entering a property, and/or specify time periods of measurement in which energy consumption may be optimized due to high user activity within the property.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
    obtaining data representing an amount of ambient light detected within the portion of the property by a light sensor located at the portion of the property;
    obtaining data indicating (i) a shape of an optical spectra for a natural light source, and (ii) a shape of an optical spectra for a non-natural light source;
    determining a relative composition of the ambient light detected within the portion of the property based at least on (i) the shape of the optical spectra for the natural light source, and (ii) the shape of the optical spectra for the non-natural light source;
    determining an estimated amount of natural light within the portion of the property based on the amount of ambient light detected within the portion of the property and the determined relative composition of the ambient light detected within the portion of the property;
    determining to adjust an amount of light output by one or more light sources located at the portion of the property based on the estimated amount of natural light within the portion of the property; and
    in response to determining to adjust the amount of light output by one or more light sources located at the portion of the property based on the estimated amount of natural light within the portion of the property, adjusting the amount of light output by one or more light sources located at the portion of the property.

2. The method of claim 1, wherein the non-natural light source comprises a light emitting diode (LED), a high-intensity discharge (HID) bulb, an incandescent bulb, or a fluorescent bulb.

3. The method of claim 1, wherein determining to adjust an amount of light output by the one or more light sources located at the portion of the property comprises determining that the estimated amount of natural light within the portion of the property satisfies a predetermined threshold for amount of natural light within the portion of the property.

4. The method of claim 1, wherein adjusting the amount of light output by the one or more light sources located at the portion of the property comprises transmitting an instruction to turn off at least one of the one or more light sources.

5. The method of claim 1, wherein adjusting the amount of light output by the one or more light sources located at the portion of the property comprises transmitting an instruction to reduce the amount of light output at least one of the one or more light sources located at the portion of the property without turning off the one or more light sources.

6. The method of claim 1, wherein determining a relative composition of the ambient light detected within the portion of the property based at least on (i) the shape of the optical spectra for the natural light source, and (ii) the shape of the optical spectra for the non-natural light source comprises:
    generating an intensity spectrum for the ambient light detected within the portion of the property by the light sensor located at the portion of the property;
    computing one or more characteristics for the generated intensity spectrum;

comparing values of the computed one or more characteristics to threshold values based at least on (i) signature peaks in the shape of the optical spectra for the natural light source, and (ii) the signature peaks in the shape of the optical spectra for the non-natural light source; and determining the relative composition of the ambient light detected within the portion of the property based on the values of the computed one or more characteristics to threshold values.

7. The method of claim 6, wherein the one or more characteristics for the generated intensity spectrum comprises a peak intensity point within the generated intensity spectrum, and one or more slope measurements for particular pixel offsets from the peak intensity point within the generated intensity spectrum.

8. The method of claim 1, wherein adjusting the amount of light output by one or more light sources located at the portion of the property comprises transmitting an instruction to a light controller to adjust the amount of light output by one or more light sources located at the portion of the property.

9. A electronic system comprising:

at least one processor; and at least one computer-readable storage medium coupled to the at least one processor having stored thereon instructions which, when executed by the at least one processor, causes the at least one processor to perform operations comprising:

obtaining data representing an amount of ambient light detected within the portion of the property by a light sensor located at the portion of the property;

obtaining data indicating (i) a shape of an optical spectra for a natural light source, and (ii) a shape of an optical spectra for a non-natural light source;

determining a relative composition of the ambient light detected within the portion of the property based at least on (i) the shape of the optical spectra for the natural light source, and (ii) the shape of the optical spectra for the non-natural light source;

determining an estimated amount of natural light within the portion of the property based on the amount of ambient light detected within the portion of the property and the determined relative composition of the ambient light detected within the portion of the property;

determining to adjust an amount of light output by one or more light sources located at the portion of the property based on the estimated amount of natural light within the portion of the property; and in response to determining to adjust the amount of light output by one or more light sources located at the portion of the property based on the estimated amount of natural light within the portion of the property, adjusting the amount of light output by one or more light sources located at the portion of the property.

10. The system of claim 9, wherein the non-natural light source comprises a light emitting diode (LED), a high-intensity discharge (HID) bulb, an incandescent bulb, or a fluorescent bulb.

11. The system of claim 9, wherein determining to adjust an amount of light output by the one or more light sources located at the portion of the property comprises determining that the estimated amount of natural light within the portion of the property satisfies a predetermined threshold for amount of natural light within the portion of the property.

12. The system of claim 9, wherein adjusting the amount of light output by the one or more light sources located at the portion of the property comprises transmitting an instruction to turn off at least one of the one or more light sources.

13. The system of claim 9, wherein adjusting the amount of light output by the one or more light sources located at the portion of the property comprises transmitting an instruction to reduce the amount of light output at least one of the one or more light sources located at the portion of the property without turning off the one or more light sources.

14. The system of claim 9, wherein determining a relative composition of the ambient light detected within the portion of the property based at least on (i) the shape of the optical spectra for the natural light source, and (ii) the shape of the optical spectra for the non-natural light source comprises:

generating an intensity spectrum for the ambient light detected within the portion of the property by the light sensor located at the portion of the property;

computing one or more characteristics for the generated intensity spectrum;

comparing values of the computed one or more characteristics to threshold values based at least on (i) the signature peaks in the shape of the optical spectra for the natural light source, and (ii) the signature peaks in the shape of the optical spectra for the non-natural light source; and determining the relative composition of the ambient light detected within the portion of the property based on the values of the computed one or more characteristics to threshold values.

15. One or more non-transitory computer-readable media storing software comprising instructions executable by one or more computers which, upon such execution, cause the one or more computers to perform operations comprising:

obtaining data representing an amount of ambient light detected within the portion of the property by a light sensor located at the portion of the property;

obtaining data indicating (i) a shape of within an optical spectra for a natural light source, and (ii) a shape of an optical spectra for a non-natural light source;

determining a relative composition of the ambient light detected within the portion of the property based at least on (i) the signature peaks within the optical spectra for the natural light source, and (ii) the signature peaks within the optical spectra for the non-natural light source;

determining an estimated amount of natural light within the portion of the property based on the amount of ambient light detected within the portion of the property and the determined relative composition of the ambient light detected within the portion of the property;

determining to adjust an amount of light output by one or more light sources located at the portion of the property based on the estimated amount of natural light within the portion of the property; and in response to determining to adjust the amount of light output by one or more light sources located at the portion of the property based on the estimated amount of natural light within the portion of the property, adjusting the amount of light output by one or more light sources located at the portion of the property.

16. The non-transitory computer-readable media of claim 15, wherein the non-natural light source comprises a light emitting diode (LED), a high-intensity discharge (HID) bulb, an incandescent bulb, or a fluorescent bulb.

17. The non-transitory computer-readable media of claim 15, wherein determining to adjust an amount of light output by the one or more light sources located at the portion of the property comprises determining that the estimated amount of natural light within the portion of the property satisfies a predetermined threshold for amount of natural light within the portion of the property.

18. The non-transitory computer-readable media of claim 15, wherein adjusting the amount of light output by the one or more light sources located at the portion of the property comprises transmitting an instruction to turn off at least one of the one or more light sources.

19. The non-transitory computer-readable media of claim 15, wherein adjusting the amount of light output by the one or more light sources located at the portion of the property comprises transmitting an instruction to reduce the amount of light output at least one of the one or more light sources located at the portion of the property without turning off the one or more light sources.

20. The non-transitory computer-readable media of claim 15, wherein determining a relative composition of the ambient light detected within the portion of the property based at least on (i) the shape of the optical spectra for the natural light source, and (ii) the shape of the optical spectra for the non-natural light source comprises:

generating an intensity spectrum for the ambient light detected within the portion of the property by the light sensor located at the portion of the property;

computing one or more characteristics for the generated intensity spectrum;

comparing values of the computed one or more characteristics to threshold values based at least on (i) signature peaks in the shape of the optical spectra for the natural light source, and (ii) the signature peaks in the shape of the optical spectra for the non-natural light source; and determining the relative composition of the ambient light detected within the portion of the property based on the values of the computed one or more characteristics to threshold values.

\* \* \* \* \*